Figure 1:
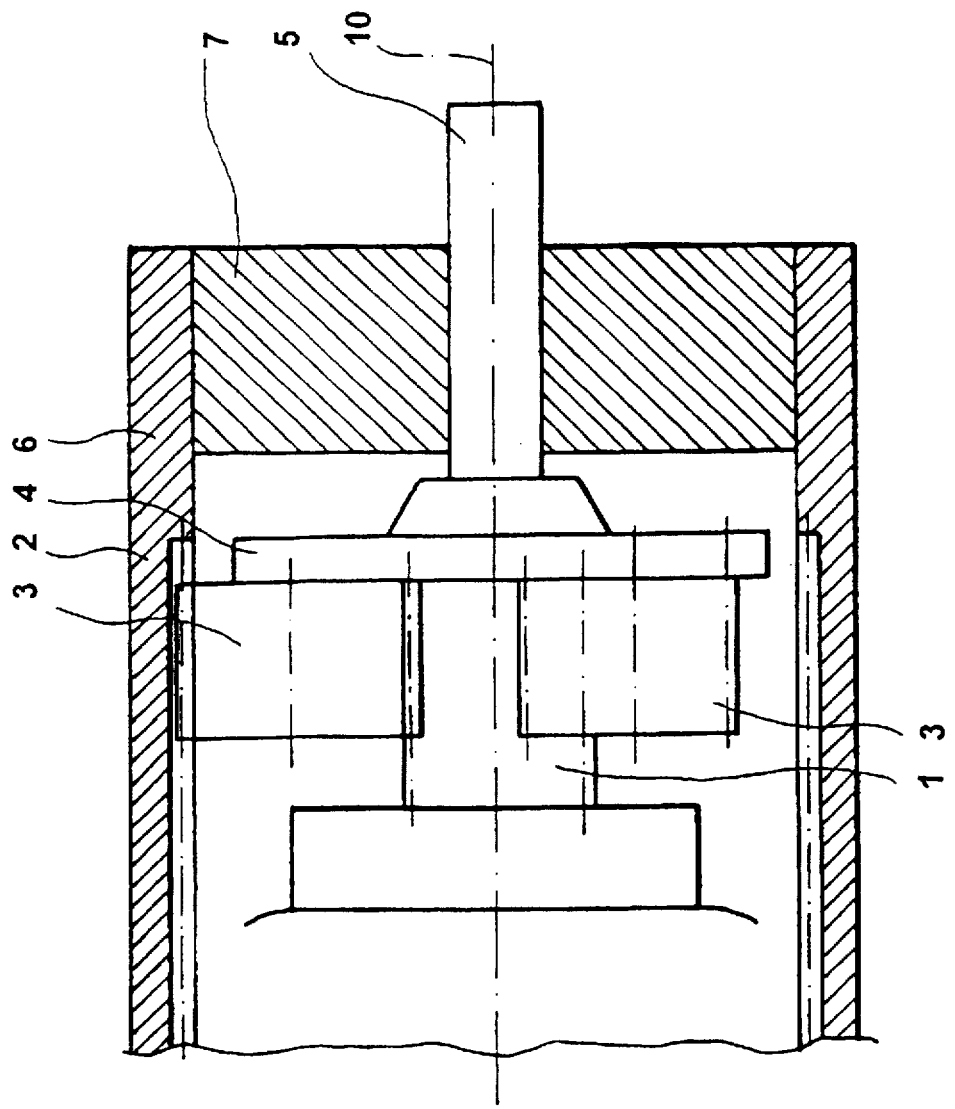

United States Patent [19]

Fütterer

[11] Patent Number: 5,779,589
[45] Date of Patent: Jul. 14, 1998

[54] PLANETARY GEARING

[75] Inventor: Bodo Fütterer, Lucerne, Switzerland

[73] Assignee: Maxon-Motor GmbH, Germany

[21] Appl. No.: 762,727

[22] Filed: Dec. 10, 1996

[30] Foreign Application Priority Data

Dec. 13, 1995 [DE] Germany ................ 195 46 586.5

[51] Int. Cl.[6] .................................................. F16H 1/28
[52] U.S. Cl. ........................................................ 475/346
[58] Field of Search ........................................... 475/346

[56] References Cited

U.S. PATENT DOCUMENTS

| 4,759,229 | 7/1988 | Takahashi et al. | 475/346 |
| 4,944,195 | 7/1990 | Takahashi et al. | 475/346 |
| 5,658,214 | 8/1997 | Hofsetter et al. | 475/346 |

FOREIGN PATENT DOCUMENTS

2661963 A  5/1990  France .
1073535    6/1967  United Kingdom .

OTHER PUBLICATIONS

241 Eureka Incorp: Engineering Materials & Design 11(1991)Jul., No. 7, Horton Kirby, Kent, GB.
Plastikverarbeiter, vol. 44, No. 3, dated Mar. 1, 1993.

*Primary Examiner*—Dirk Wright
*Attorney, Agent, or Firm*—Tilton, Fallon, Lungmus & Chestnut

[57] ABSTRACT

The present invention refers to a planetary gearing comprising a planet carrier which is adapted to be rotated about an axis of rotation, a sun gear, at least one planetary gear, and a ring gear, at least one axle end projecting beyond one end face of said planet carrier and said planetary gear being rotatably supported on said axle end by means of its axle-reception opening. Especially in small-size planetary gearings making use of sintered components, the service life is to be improved. For this purpose, it is suggested that the planetary gear should be constructed such that it is at least radially displaceable with regard to the axis of rotation of the said planet carrier.

10 Claims, 4 Drawing Sheets

PLANETARY GEARING

The present invention refers to a planetary gearing comprising a planet carrier which is adapted to be rotated about an axis of rotation, a sun gear, at least one planetary gear, and a ring gear, at least one axle end projecting beyond an end face of said planet carrier and the said planetary gear being rotatably supported on said axle end by means of its axle-reception opening.

Especially in small-size planetary gearings in which sintered materials are used, it has been discovered that uniform bearing of the tooth profiles of the planetary gear rotating between the ring gear and the sun gear could not be achieved in most cases. This circumstance had, among other effects, the effect that the service life of such gearings was insufficient for many cases of use. In addition, it was difficult for the manufacturers to predict the service life of such gearings, since variations in the order of factor 10 to factor 100 occurred. Especially in the output stage of the planetary gearings where the highest forces occur at low velocities, it must be guaranteed that all planetary gears bear uniformly. An irregularity may cause locally very high forces which exceed the admissible range by far and which cannot be detected due to the high speed reduction. In addition, noise caused by beat vibration occurs, which varies periodically with the rotational speed. This circumstance and the large variations occurring in small-size planetary gearings in the prior art has, up to now, not been satisfactory from the point of view of those skilled in the art.

It is the object of the present invention to provide a planetary gearing, especially a small-size planetary gearing, which has an improved service life.

In accordance with the present invention, this object is achieved by the feature that the planetary gear is constructed such that it is at least radially displaceable with regard to the axis of rotation of the planet carrier. "Radially displaceable" means here an amount of play exceeding the normal amount, which causes in the radial direction a quasi floating support of the planetary gears.

The tolerance compensation achieved in this way also has the effect that no constraining guide forces are transmitted in the radial direction between the axle ends and the axle-reception openings of the planetary gears; such constraining forces would occur as a result of inaccuracies. Comprehensive long-time tests showed in an impressive manner that the service life of such gearings is increased. In addition, uniform contact areas were detected at the tooth profiles, and this is apparently the reason for the improved service life.

The radial displaceability can preferably be achieved on the basis of the feature that the cross-sectional shape of the axle end on the planet carrier deviates from the cross-sectional shape of the axle-reception opening of the planetary gear in such a way that said planetary gear is supported in a radially displaceable manner relative to said axle end. Due to the fact that each planetary gear rotates between the ring gear and the sun gear, it is already acted upon by a guiding component, and, consequently, the axle end primarily serves to apply a tangential thrust force. The measure of varying the cross-section of the axle end such that the planetary gear can be displaced radially does not cause any problems in most cases of use. The higher the number of planetary gears grouped around the sun gear is, the more advantageous will this measure be.

It will be advantageous when the planetary gear is supported such that it is adapted to be displaced radially as well as tangentially relative to the axis of rotation of the planet carrier, the amount of tangential displaceability being smaller than the amount of radial displaceability. In most cases of use, especially in the case of small-size planetary gearings, an amount of tangential play between the axle end and the planetary gear can definitely be admitted. This will simplify the production of the axle end, since comparatively simple cross-sections will satisfy the requirements according to the present invention. This amount of play between the axle end and the axle-reception opening has additionally the advantage that the planetary gear can also undergo an angular displacement relative to the axis of the axle end so that a non-parallelism of the various axes of rotation will be compensated for as well. In accordance with one embodiment, an axle end having a substantially elliptical crosssection is particularly useful. Due to the elliptical shape, the contact surfaces between the axle end and the axle-reception opening can be optimized, the radial displaceability and the smaller amount of tangential displaceability being realized simultaneously.

In accordance with a preferred embodiment, the ratio of radial to tangential displaceability is greater than 1, preferably greater than 2.

The present invention will produce a particularly advantageous effect when used in an embodiment where at least the axle ends of the planet carrier are made of a sintered material. In view of the fact that sintered materials are very easily affected by non-uniform loads, the present invention constitutes a substantial improvement in this respect.

According to one embodiment, zirconium oxide can especially be used as a sintered material, whereby the service life will again be increased substantially.

In addition, for a method of producing a planetary gearing is disclosed the.

This method is characterized by the features that at least the axle end on the planet carrier for the planetary gear is produced by means of a sintering process in such a way that it has a cross-section which deviates from the cylindrical axle-reception opening of the planetary gear and which permits at least a radial displacement of the planetary gear on said axle end with regard to the axis of rotation of the planet carrier.

In view of the fact that all the possible cross-sectional shapes can easily be produced by a sintering process, the present method is excellently suitable for producing a planetary gearing according to the present invention.

Furthermore, the axle end of the planetary gear on the planet carrier can be produced such that it has a substantially elliptical cross-section, whereby an advantageous ratio between radial and axial displaceability can be obtained.

In accordance with an advantageous embodiment, the powdery sintered material can be mixed with a plastic material and injection moulded on an injection moulding machine so as to produce a blank. This variation of the method according to the present invention is suitable for producing a great number of different shapes of blanks from sintered materials. Most of the plastic material is subsequently removed from the blank in processes taking place after the injection moulding.

In accordance with one variation of the method according to the present invention, at least the axle end can be polished at its circumferential surface after the sintering process. Especially in the case of sintered materials, it is possible to achieve excellent surfaces in this way and, on the basis of these excellent surfaces, less wear.

Figure 2:
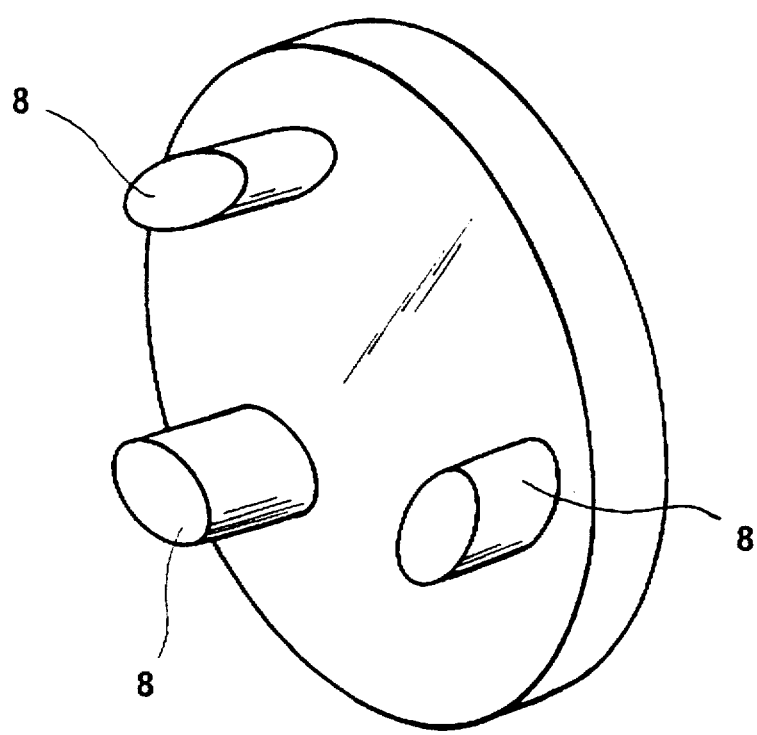
Figure 3:
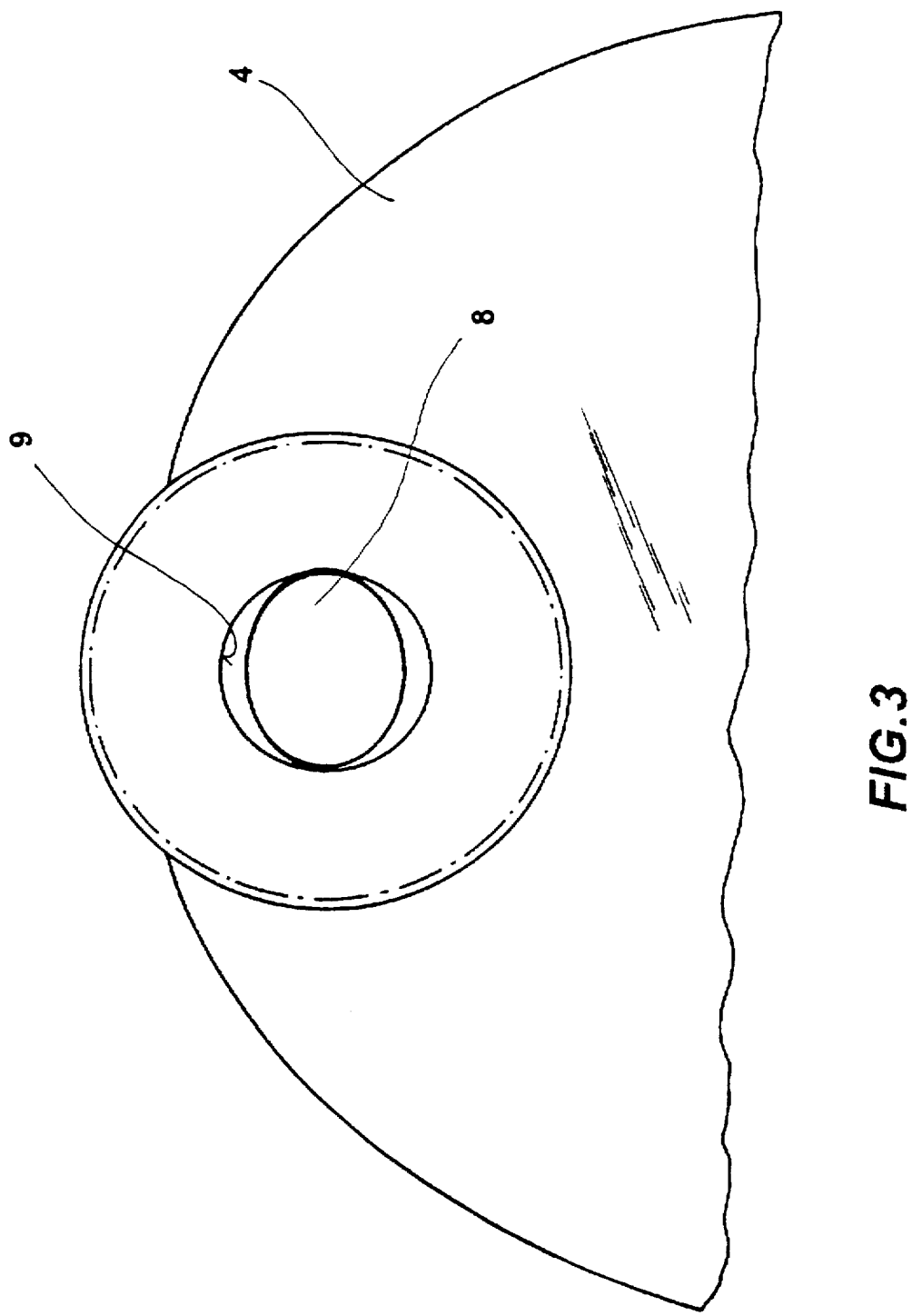
Figure 4:
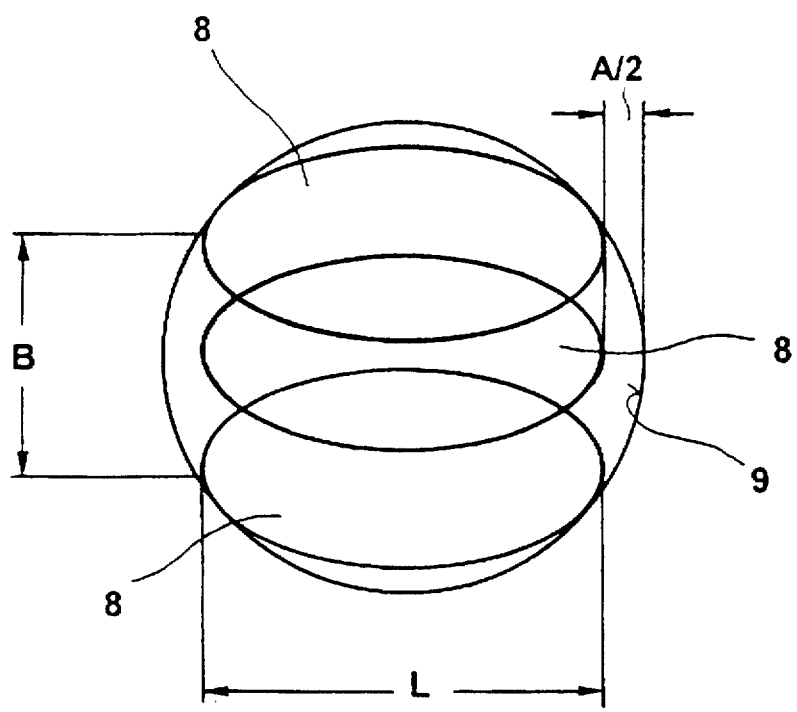

In the following, one embodiment of the present invention will be explained in detail making reference to a drawing, in which FIG. 1 shows a schematic sectional view of an output stage of a planetary gearing, FIG. 2 shows a perspective view of a planet carrier according to the present invention, FIG. 3 shows an enlarged front view of a detail of the planet carrier with a planetary gear, and FIG. 4 shows a schematic illustration drawing for explaining the displacement process of an axle end in an axle-reception opening of the planetary gear.

FIG. 1 shows the output stage of a planetary gearing comprising a sun gear 1, a ring gear 2 arranged coaxially therewith, three planetary gears 3 grouped around the sun gear 1 and a planet carrier 4 with an output shaft 5. The sun gear 1 can either be arrranged on a small-power electric motor or it can be the output shaft of a preceding planetary gearing stage. For this reason, the connection of the sun gear 1 is shown only schematically. The ring gear 2 serves simultaneously as a casing for the planetary gearing, and in the end portion 6 thereof a bearing disk 7 is arranged for supporting the output shaft 5. The planetary gears 3 are arranged such that they are uniformly distributed over the circumference and, normally, they are in mesh with the sun gear 1 and the internal teeth of the ring gear 2.

As can especially be seen on the basis of FIG. 2 to 4, the planet carrier 4 comprises, accordingly, three axle ends 8 projecting perpendicularly above one end face thereof. The axle ends 8 are used for receiving thereon and for guiding the planetary gears 3 and, consequently, they are inserted in an axle-reception opening 9 of the planetary gears 3. The axle-reception opening 9 of the planetary gears 3 has a circular cross-section, whereas the cross-section of the axle ends 8 is essentially elliptical. The ellipse is orientated such that its narrowest cross-sectional area is arranged at right angles to the axis of rotation 10. The broadest areas of the elliptical cross-section touch the axle-reception opening 9 approximately at the pitch diameter (slightly above due to the shape).

All the components of the planetary gearing shown in the drawing are made of sintered material and have, consequently, a high strength. In particular in the output stage explained in the present connection, very high forces occur due to the comparatively low rotational speeds. At least as far as the axle ends 8 are concerned, zirconium oxide may be used as a sintered material for improving the service life. The planet carrier 4 and the axle ends 8 can, however, also be formed integrally with one another.

The sintered parts are preferably produced by mixing the powdery sintered material with plastic material, followed by injection moulding of a blank on an injection moulding machine and, finally, by a sintering process. The surfaces of the axle ends 8 and axle-reception openings 9 as well as the surface of the output shaft 5 can additionally be polished. Also the tooth profiles of the gears can subsequently be subjected to finish-sizing and polishing processes.

In the following, the mode of operation of the above embodiment will be explained in detail.

In view of the fact that the elliptical cross-section of the axle end 8 has a length L which is smaller than the cross-section of the axle-reception opening 9, a certain amount of tangential play A as well as certain amount of radial play B are obtained. In FIG. 4, these dimensional differences are shown in an exaggerated representation. For example, when the axle-reception opening 9 has a diameter of 3.0 mm, play A can approx. be 0.01 mm and play B can approx. be 0.1 mm. This results in a ratio of radial to tangential displacement of 10.

This embodiment guarantees that the tangential play is substantially smaller than the radial play. Due to the addition of dimensional tolerances in the output stage of the planetary gearing, it can never be guaranteed with certainty that the axis of rotation 10 rotates coaxially with the axis of the ring gear 2 and of the sun gear 1. Furthermore, it cannot be guaranteed with absolute certainty that all three axle ends 8 move on concentric pitch circles about the axis of rotation 10.

In order to obtain in gearings of this type, where especially sintered parts, such as the axle ends 8 and the planetary gears 3, are used, an essentially uniform contact pressure of the meshing teeth, the planetary gears 3 are adapted to be displaced in the radial direction on the basis of the cross-sectional conditions existing between the axle ends 8 and the axle-reception opening 9. This permits said planetary gears 3 to be centered automatically between the sun gear 1 and the ring gear 2 in an appropriate manner at any time, without any transmission of radial constraining forces from said axle ends 8 to said planetary gears 3. In principle, the radial play B must only be chosen sufficiently large to permit a compensation of the dimensional variations that are permissible in view of the tolerances.

Long-time tests carried out in connection with this arrangement have shown that the service life could be substantially increased due to a more uniform contact pressure (as could be discovered by observing the points of contact). Especially in cases where sintered parts are used and in the case of the small dimensions of the planetary gearing described hereinbefore, the service life can now be predicted more effectively.

For the sake of completeness, it should also be mentioned that the axle end 8 may also have a shape which is adapted to the curvature of the pitch circle so that the points of contact will essentially be located precisely on said pitch circle.

I claim:

1. In a planetary gearing comprising a planet carrier (4) which is adapted to be rotated about an axis of rotation (10), a sun gear (1), at least one planetary gear (3), a ring gear (2), at least one axle end (8) projecting beyond one end face of said planet carrier (4), and said planetary gear (3) being rotatably supported on said axle end (8) by means of its axle-reception opening (9), said planetary gear (3) being constructed such that it is at least radially displaceable with regard to said axis of rotation (10) of said planet carrier (4), and wherein the cross-sectional shape of said axle end (8) an said planet carrier (4) deviates from the cross-sectional shape of said axle-reception opening (9) of said planetary gear in such a way that said planetary gear (3) is supported in a radially displaceable manner relative to said axle end (8), the improvement comprising that said planetary gear (3) is supported such that it is adapted to be displaced radially as well as tangentially relative to said axis of rotation (10) of said planet carrier (4), the amount of said tangential displaceability being smaller than the amount of said radial displaceability.

2. In the planetary gearing according to claim 1, wherein said axle end (8) on said planet carrier (4) has a substantially elliptical cross-section.

3. In the planetary gearing according to claim 1, wherein the ratio of said radial to said tangential displaceability is greater than 1.

4. In the planetary gearing according to claim 1, wherein said at least one axle end (8) of said planet carrier (4) is made of a sintered material.

5. In the planetary gearing according to claim 4, wherein zirconium oxide is used as said sintered material.

6. A method of producing a planetary gearing comprising a planet carrier (4) which is adapted to be rotated about an axis of rotation (10), a sun gear (1), at least one planetary gear (3), a ring gear (2), at least one end (8) projecting beyond one end face of said planet carrier (4), and said planetary gear (3) being rotatably supported on said axle end (8) by means of its axle-reception opening (9), the method comprising the step of producing said at least one axle end (8) on said planet carrier (4) by means of a sintering process such that said one axle end (8) has a cross-section which deviates from said cylindrical axle-reception opening (9) of said planetary gear (3) and which permits at least radial displacement of said planetary gear (3) on said axle end (8) with regard to said axis of rotation (10) of said planet carrier (4).

7. The method according to claim 6, and the steps of forming said at least one axle end (8) of said planetary gear (3) on said planet carrier (4) such that it has a substantially elliptical cross-section.

8. The method according to claim 6 or 7, and the step of producing said at least one axle end (8) by mixing a powdery sintered material with a plastic material, and injection molding said mixture on an injection molding machine so as to produce a blank.

9. The method according to claim 6, and the step of polishing said at least one axle end (8) at its circumferential surface after said sintering process step.

10. In the planetary gearing according to claim 3, wherein said ratio of said radial to said tangential displaceability is greater than 2.

* * * * *

UNITED STATES PATENT AND TRADEMARK OFFICE
CERTIFICATE OF CORRECTION

PATENT NO. : 5,779,589
DATED : July 14, 1998
INVENTOR(S) : Bodo Futterer

It is certified that error appears in the above-indentified patent and that said Letters Patent is hereby corrected as shown below:

In Claim 4, Column 4, Line 44, "an" should be ---on---.

Signed and Sealed this

Twenty-second Day of September, 1998

Attest:

BRUCE LEHMAN

Attesting Officer          Commissioner of Patents and Trademarks